United States Patent
Ko et al.

(10) Patent No.: US 9,800,350 B2
(45) Date of Patent: Oct. 24, 2017

(54) INCREASED DENSITY SFP CONNECTOR

(71) Applicant: INTEL CORPORATION, Santa Clara, CA (US)

(72) Inventors: Jamyuen Ko, San Jose, CA (US); Qi Qi, Campbell, CA (US)

(73) Assignee: Intel Corporation, Santa Clara, CA (US)

( * ) Notice: Subject to any disclaimer, the term of this patent is extended or adjusted under 35 U.S.C. 154(b) by 719 days.

(21) Appl. No.: 13/730,728

(22) Filed: Dec. 28, 2012

(65) Prior Publication Data

US 2013/0189856 A1 Jul. 25, 2013

Related U.S. Application Data

(60) Provisional application No. 61/589,717, filed on Jan. 23, 2012, provisional application No. 61/590,172, filed on Jan. 24, 2012.

(51) Int. Cl.
| | |
|---|---|
| H01R 13/518 | (2006.01) |
| H04B 10/69 | (2013.01) |
| H04B 10/60 | (2013.01) |

(52) U.S. Cl.
CPC .......... *H04B 10/69* (2013.01); *H01R 13/518* (2013.01); *H04B 10/60* (2013.01)

(58) Field of Classification Search
CPC ....... H01R 13/518; H04B 10/60; H04B 10/69
See application file for complete search history.

(56) References Cited

U.S. PATENT DOCUMENTS

| | | | |
|---|---|---|---|
| 5,425,651 A * | 6/1995 | Thrush | H01R 12/83 439/326 |
| 6,220,878 B1 * | 4/2001 | Poplawski et al. | 439/92 |
| 6,434,015 B1 * | 8/2002 | Hwang | 439/76.1 |
| 6,942,524 B2 * | 9/2005 | Wu | H01R 12/716 439/62 |
| 7,227,745 B2 * | 6/2007 | Kowalkowski et al. | 361/679.33 |
| 7,833,068 B2 * | 11/2010 | Bright | H01R 13/502 439/733.1 |
| 2004/0127105 A1 * | 7/2004 | Itano et al. | 439/676 |
| 2008/0070439 A1 * | 3/2008 | Kusuda et al. | 439/540.1 |
| 2012/0129402 A1 * | 5/2012 | Wang et al. | 439/629 |
| 2012/0196477 A1 * | 8/2012 | Nichols et al. | 439/607.01 |
| 2012/0208405 A1 * | 8/2012 | Wang et al. | 439/676 |
| 2012/0302072 A1 * | 11/2012 | Hsu et al. | 439/61 |
| 2013/0012038 A1 * | 1/2013 | Kirk et al. | 439/55 |

* cited by examiner

*Primary Examiner* — Briggitte R Hammond
(74) *Attorney, Agent, or Firm* — Blakely, Sokoloff, Taylor & Zafman LLP

(57) ABSTRACT

A connector device includes a pluggable interface and a corresponding connector. The pluggable interface includes multiple rows of pads. Similarly, the connector includes multiple rows of contacts to contact the multiple rows of pads. The multiple rows of pads can further be subdivided where at least certain pad locations are subdivided into two smaller pads. At least certain pads can be disposed at angles other than right angles. The connector can include a cover with a mechanism to depress the second row of contacts. The depression mechanism is engaged via side wings on the cover engage with legacy plugs and avoid contact between the second row of contacts and the pads of the legacy plug.

6 Claims, 13 Drawing Sheets ions of embodiments of the invention. The drawings
INCREASED DENSITY SFP CONNECTOR

RELATED APPLICATIONS

This patent application claims the benefit of priority of U.S. Provisional Application No. 61/589,717, filed Jan. 23, 2012, and U.S. Provisional Application No. 61/590,172, filed Jan. 24, 2012.

FIELD

Embodiments of the invention are generally related to device interconnections, and more particularly to increasing density and bandwidth in a pluggable connector system while maintaining form factor.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2012, Intel Corporation, All Rights Reserved.

BACKGROUND

The demand for computing devices continues to rise, even as the demand for computing devices to achieve higher performance also rises. The data storage and data sharing among devices continues to increase with demand for higher performance. Conventional interconnections do not offer sufficient speed and/or bandwidth to meet future expectations. With previous generations of electronic devices, manufacturers could simply add more connectors or more pins to the connections to increase the speed and/or bandwidth available. However, even though there is increasing demand for higher performance, there is demand for smaller and more portable devices, which decreases the area available for interconnections.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1A:
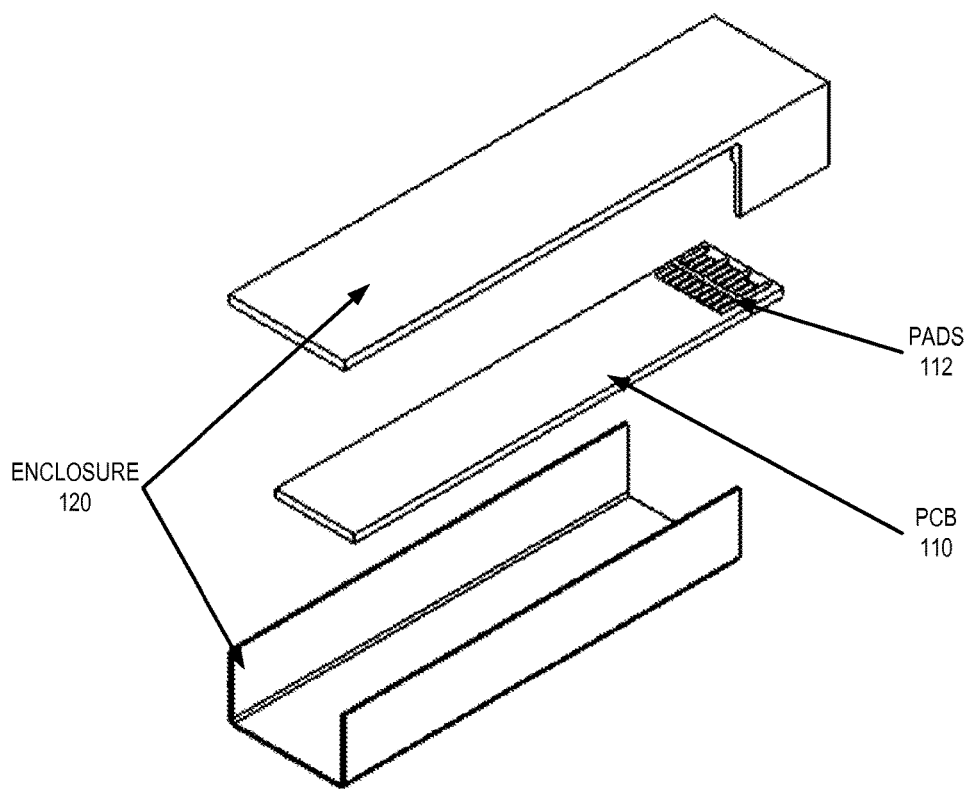
FIG. 1A is a block diagram of an embodiment of a pluggable transceiver device.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As described herein, a connection subsystem includes a pluggable interface device and a corresponding connector.

The pluggable interface device includes multiple rows of pads. The connector includes multiple rows of contacts corresponding to the pads to contact the multiple rows of pads. Thus, without changing vertical or horizontal dimensions, a connector can add more interconnection pins by including multiple separate rows of pads/contacts, all substantially parallel to each other. The added pads and contacts provide higher bandwidth interconnection with essentially the same connection profile. One area of improvement where such interconnection can be used is in optical interfaces, by including more pads and contacts on an electrical end of an optical interface connector. By increasing the depth of the connector slightly, and increasing the density of electrical contacts, a higher bandwidth interconnection becomes possible. In one embodiment, a 10 Gb/s optical connector can be expanded into a 40 Gb/s connector (e.g., a 4-channel SFP connector to accept a 4-channel SFP optical transceiver) with minimal or no change to the footprint of the connector subsystem.

Further, more than two rows of pads/contacts can be added, and at least one of the multiple rows of pads can further be subdivided where at least certain pad locations are subdivided into two smaller pads. At least certain pads can be disposed at angles other than right angles. The rows of contacts and pads are substantially perpendicular to a direction of insertion of a pluggable device into a mating connector. Thus, the added rows can be said to be added in or along the direction of insertion of the pluggable device. The added rows can be thought of as an array of pads instead of a single row of pads, where there are nominally M rows of N pads each (where certain rows can have some of the pads subdivided). Thus, very high bandwidth connectors can be made that are usable in high-bandwidth applications such as high-speed networking switches in telecommunications and/or data centers.

In one embodiment, because the form factor of the pluggable device does not change, legacy devices could be usable with new connectors having multiple rows of contacts. However, it will be understood that if a connector includes multiple rows of contacts, there is a risk of shorting multiple contacts across a legacy pad. In one embodiment, the connector can include a cover with a mechanism to depress the second row (or other additional rows) of contacts. In one embodiment, the depression mechanism is engaged via side wings on the cover that engage with legacy plugs and avoid contact between the additional row(s) of contacts and the pads of the legacy plug or pluggable device.

The side wings can be included as part of a cover over the connector, which can make the connector compatible with multi-row plugs as well as backward compatible with other plugs that do not include multiple rows. Thus, the plugs can be hot-pluggable even with additional rows of contacts and pads; the mechanism to depress the contacts prevents shorting during hot plugging.

FIG. 1A is a block diagram of an embodiment of a pluggable transceiver device. PCB (printed circuit board) 110 is a platform for a pluggable device or a plug. As seen, PCB 110 includes multiple rows of pads 112. In one embodiment, PCB 110 and enclosure 120 make up a small form-factor pluggable (SFP) transceiver. The increased rows of pads 112 increase density and bandwidth of the plug. In one embodiment, traces from components (not shown) to pads 112 are made on inner layers of PCB 110.

Figure 1B:
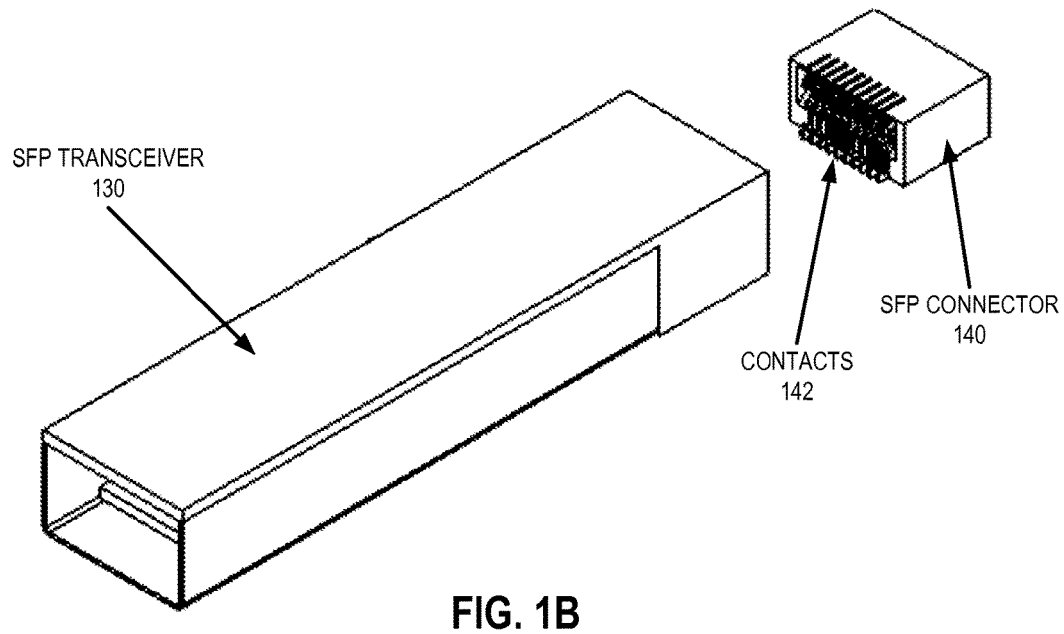
FIG. 1B is a block diagram of an embodiment of a connector to receive a pluggable transceiver device.

FIG. 1B is a block diagram of an embodiment of a connector to receive a pluggable transceiver device. SFP transceiver 130 provides one example of a plug or pluggable device that includes multiple rows of pads 112. SFP connector 140 provides one example of a mating connector that includes multiple rows of contacts 142 corresponding to the multiple rows of pads 112.

Figure 2:
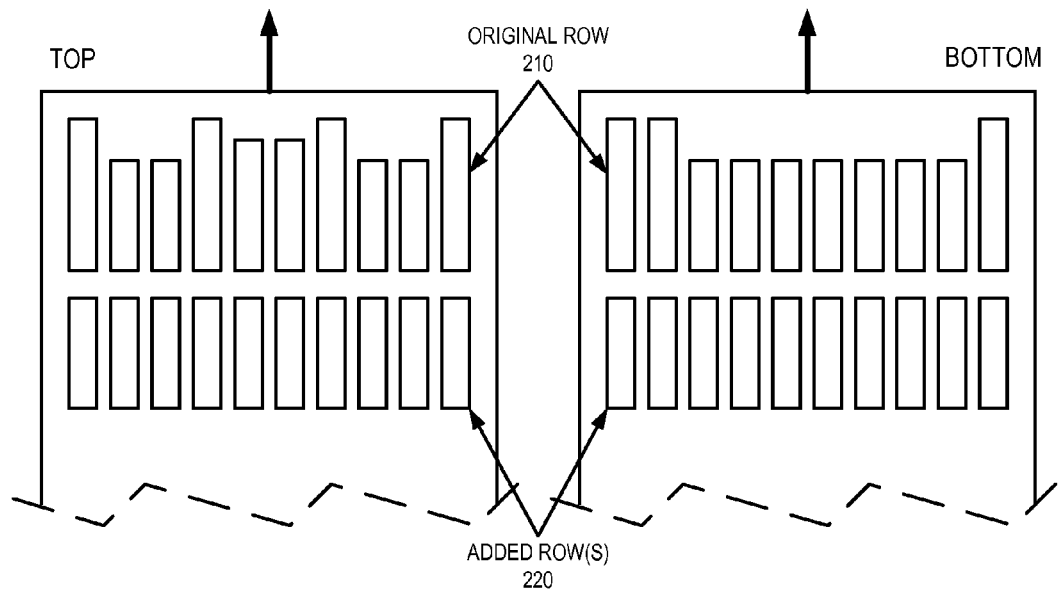
FIG. 2 is a block diagram of an embodiment of a pad layout for a pluggable device.

FIG. 2 is a block diagram of an embodiment of a pad layout for a pluggable device. In one embodiment, new pads are added on each side of the pluggable PCB. The top side of the PCB includes original row 210 of pads, and the bottom row also includes the original row of pads 210. Original row 210 represents the legacy design or configuration of the pluggable PCB. As shown, the pluggable PCB includes added rows 220. In one embodiment, added rows 220 include a single added row on only the top or bottom of the PCB. In another embodiment, added rows 220 include a single added row on the top and a single added row on the bottom of the PCB. In another embodiment, other more rows are added, and/or rows with different configurations are provided (such as in the examples of FIGS. 3-5). The top and bottom PCB surfaces can include different numbers of total rows.

When the pluggable PCB is inserted into a mating or corresponding connector, the added pads on the PCB and added contacts in the connector will contact or press against each other, thus complete the electrical circuit. The original row of pads 210 could also be labeled "legacy," referring to the pads present in legacy devices that do not include additional row(s) of pads, making the device backward compatible with legacy connectors.

The arrows illustrate the direction of insertion when mating the pluggable PCB with a corresponding connector. As shown, the rows are perpendicular to the direction of insertion (when the row is understood as a line through the center-point of the pads). Each pad is laid out in the direction of insertion, with the length of the pad along the axis of the direction of insertion of the PCB. The added row(s) can thus be placed behind the original pads from the perspective of the direction of insertion, in that original pads 210 will engage with the connector prior to the added row(s) of pads 220. The added row(s) can be understood as making an array of pads to connect to rows of a corresponding connector.

Figure 3:
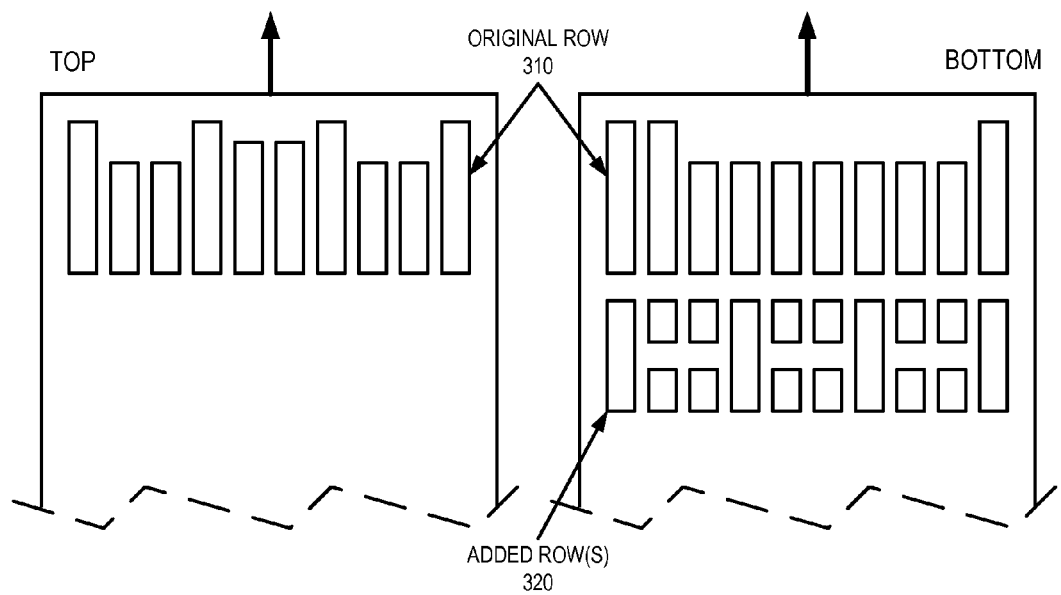
FIG. 3 is a block diagram of another embodiment of a pad layout for a pluggable device.

FIG. 3 is a block diagram of another embodiment of a pad layout for a pluggable device. In one embodiment, the top surface of the pluggable PCB includes only the original row of pads 310. The bottom surface includes original row 310, and one or more added rows 320. As illustrated, a single added row 320 is provided on the bottom surface, and the added row is subdivided with certain pads being separated into two smaller pads. Each row can be considered to have columns of pads in an array of pads. Thus, the array is not strictly M×N, because some columns have more rows than other columns. Other such configurations are also possible. As with FIG. 2, the arrows indicate the direction of insertion.

Figure 4:
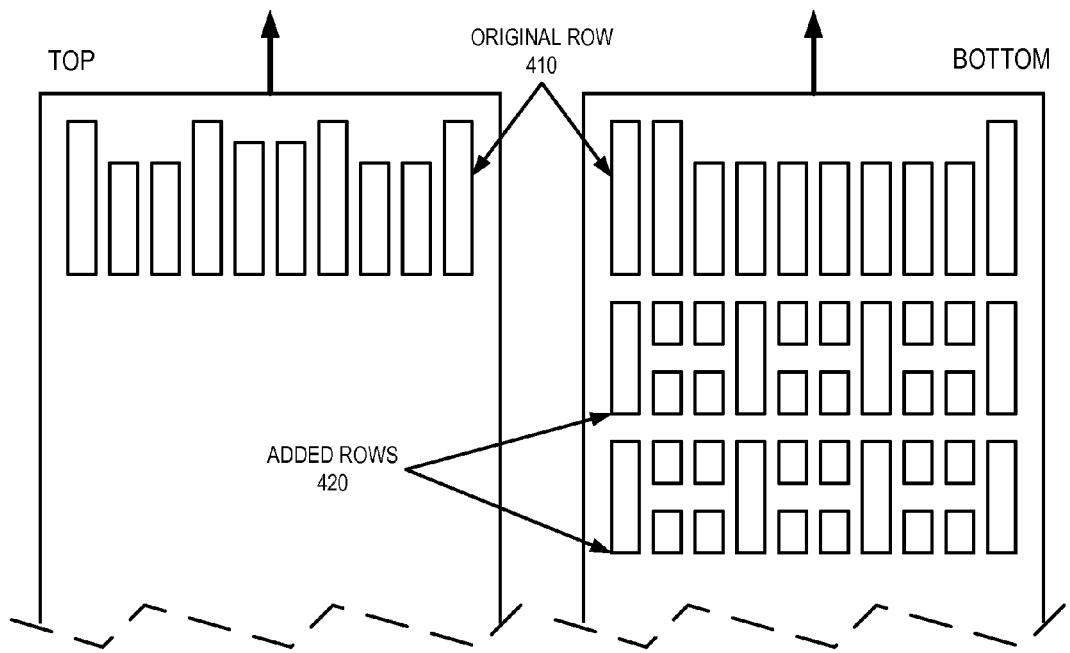
FIG. 4 is a block diagram of another embodiment of a pad layout for a pluggable device.

FIG. 4 is a block diagram of another embodiment of a pad layout for a pluggable device. In one embodiment, the top surface of the pluggable PCB includes only the original row of pads 410, although the top surface could include additional row(s) 420 in one embodiment. The bottom surface includes original row 410, and multiple added rows 420, for first, second, and third rows of pads. Each added row 420 may or may not be subdivided. As illustrated, the rows are subdivided. It will be understood, however, that only one of added rows 420 could be subdivided, while another added row 420 is not subdivided. Other such configurations are also possible. As with FIG. 2, the arrows indicate the direction of insertion.

Figure 5:
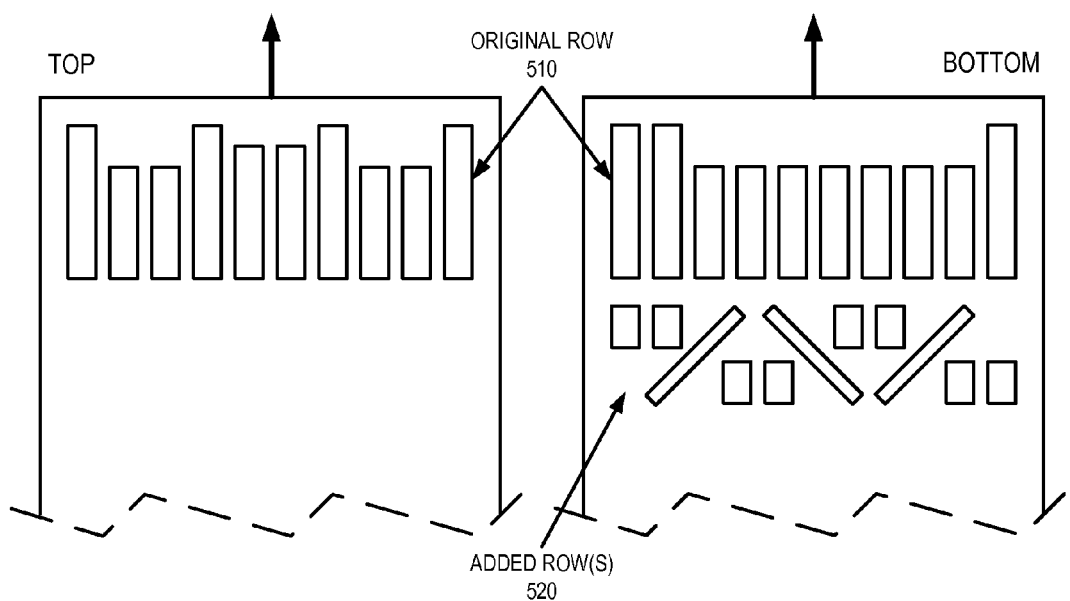
FIG. 5 is a block diagram of another embodiment of a pad layout for a pluggable device.

FIG. 5 is a block diagram of another embodiment of a pad layout for a pluggable device. In one embodiment, the top surface of the pluggable PCB includes only the original row of pads 510, although the top surface could include additional row(s) 520 in one embodiment. The bottom surface includes original row 510, and added row 520. As illustrated, added row 520 is subdivided. In the embodiment shown, added pads can have a different orientation, shape, dimensions, or a combination of these with respect to original pads 510. Thus, added pads can be provided at angles or more or less than 90 degrees with respect to the angle of insertion indicated by the arrows. Thus, the added pads can be offset with respect to original pads 510.

Figure 6A:
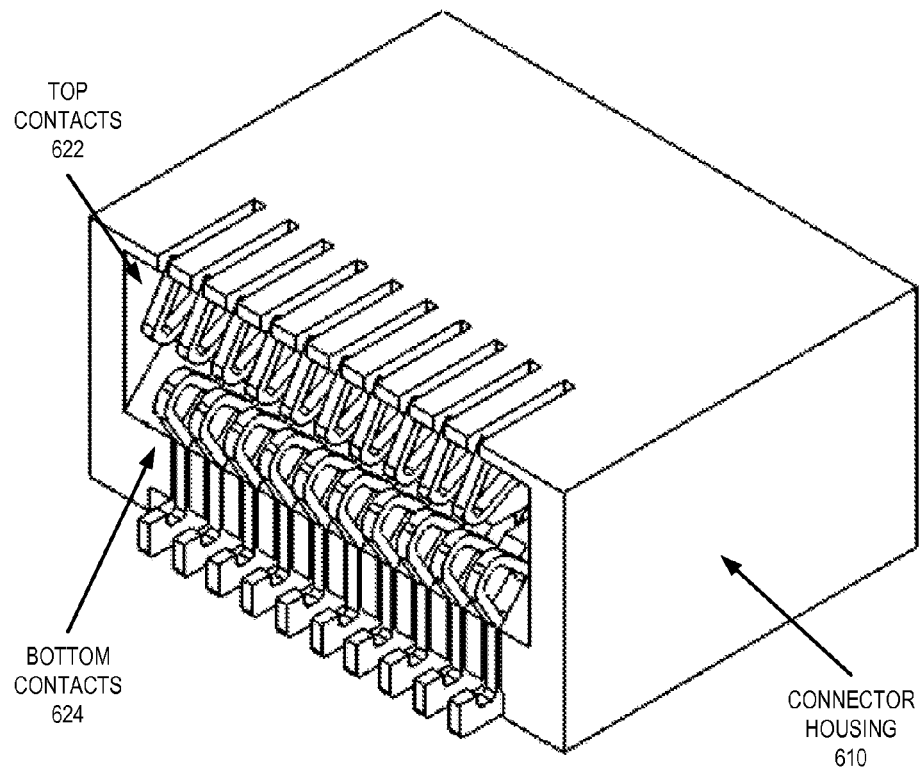
FIG. 6A is a block diagram of an embodiment of a perspective view of a connector to receive a pluggable device.

FIG. 6A is a block diagram of an embodiment of a perspective view of a connector to receive a pluggable device. The connector includes housing 610, in which the electrical contacts are disposed. As seen, top contacts 622 and bottom contacts 624 are visible at the mouth of connector housing 610. In one embodiment, contacts 622 and 624 visible at the mouth of connector housing 610 are added contacts to connect to added pads on a pluggable device or pluggable PCB. Thus, it will be understood that legacy contacts can be disposed within connector housing 610.

Figure 6B:
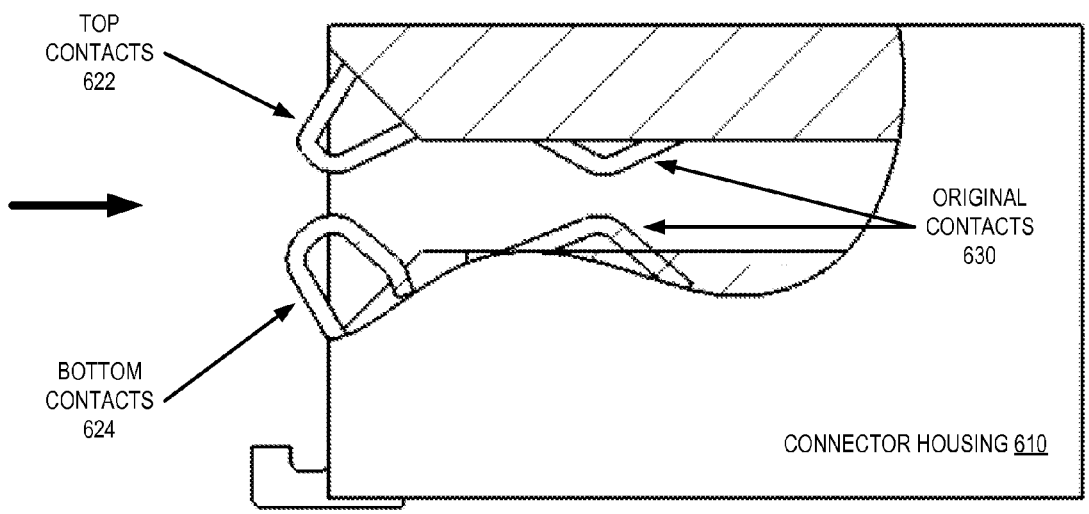
FIG. 6B is a block diagram of an embodiment of a side view of a connector to receive a pluggable device, the connector including multiple rows of contacts.

FIG. 6B is a block diagram of an embodiment of a side view of a connector to receive a pluggable device, the connector including multiple rows of contacts. Original contacts 630 are illustrated inside connector housing 610. Top contacts 622 and bottom contacts 624 are added contacts for an embodiment where the pluggable PCB includes pads on the top surface and bottom surface. It will be understood that the labels "top" and "bottom" can be considered arbitrary. However, for purposes of discussion herein, the top surface of the PCB can be understood as a surface that faces away from a substrate or PCB on which housing connector 610 is mounted or disposed. The bottom surface can be understood as the surface that faces towards the substrate or PCB on which housing connector 610 is mounted or disposed.

The arrow indicates the direction of insertion of the pluggable device. As discussed above, it will be understood that the added pads on the pluggable device will engage with the connector after the original pads. In contrast, it will be understood that the added contacts 622 and 624 are positioned to engage with the pluggable device before original contacts 630.

Figure 7A:
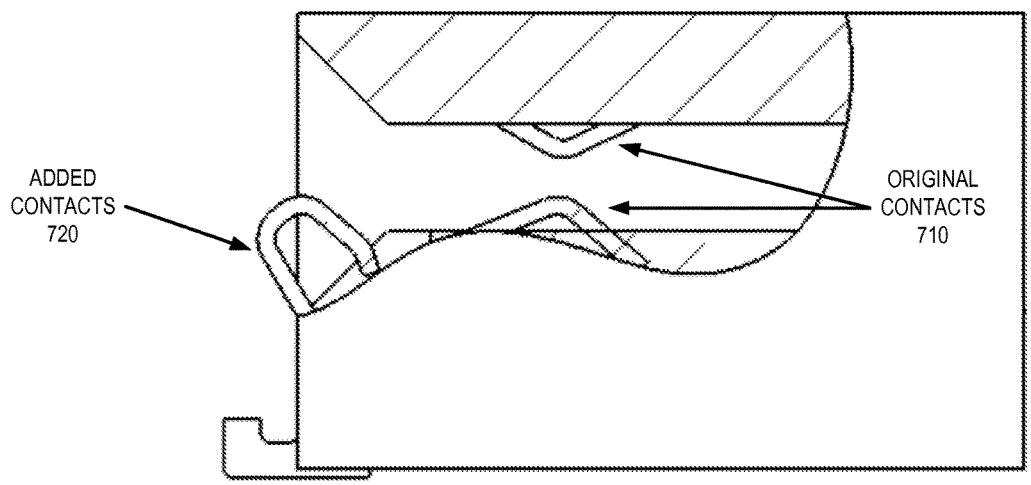
FIG. 7A is a block diagram of another embodiment of a side view of a connector to receive a pluggable device, the connector including multiple rows of contacts.

FIG. 7A is a block diagram of another embodiment of a side view of a connector to receive a pluggable device, the connector including multiple rows of contacts. Original contacts 710 are illustrated inside the connector housing. On the top side, which interfaces with a top surface of a pluggable device, only original contacts 710 are illustrated. Such an implementation corresponds to an embodiment where there are only the original pads on the top surface of the pluggable device. There are multiple rows of contacts on the bottom corresponding to an array of pads to mate with the illustrated connector. Added contacts 720 correspond to added pads.

Figure 7B:
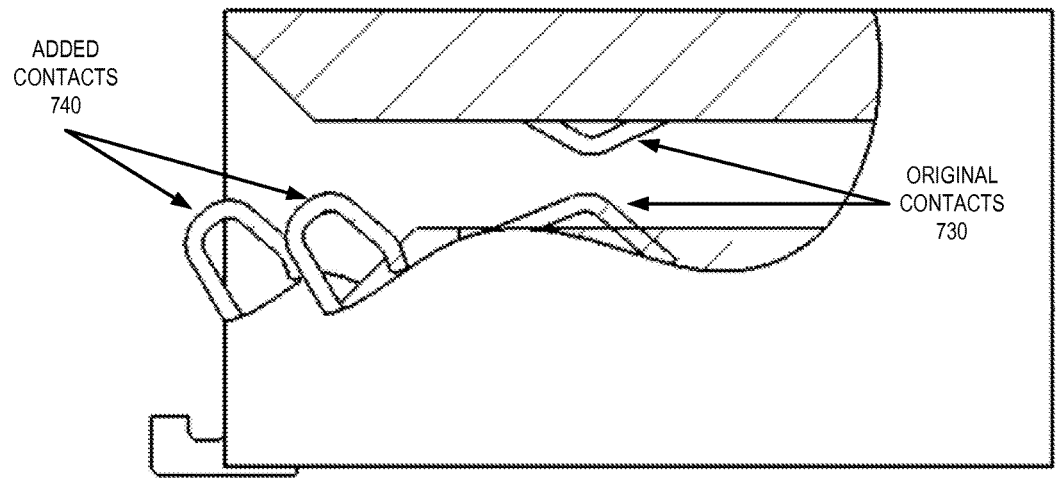
FIG. 7B is a block diagram of another embodiment of a side view of a connector to receive a pluggable device, the connector including multiple rows of contacts.

FIG. 7B is a block diagram of another embodiment of a side view of a connector to receive a pluggable device, the connector including multiple rows of contacts. As with FIG. 7A, original contacts 730 are illustrated on the top and bottom, but there are only the original contacts on the top of the connector. In one embodiment, there are multiple additional rows of contacts 740. Such a configuration can correspond to an embodiment of a pluggable device that includes multiple rows of added pads on the bottom surface. Such a configuration could alternatively correspond to an embodiment of a pluggable device that includes a single, subdivided row on the bottom surface. It will be understood that in an embodiment where the pluggable device includes multiple rows of added pads, the added contacts 740 may need to be separated further apart, and/or include another row or rows of added contacts (not shown). It will be understood also that adding more rows of contacts on either the top or bottom surface may require increasing the depth of the connector to allow for the pluggable device to be inserted deeper to allow contact between all the added pads and added contacts.

Figure 8:
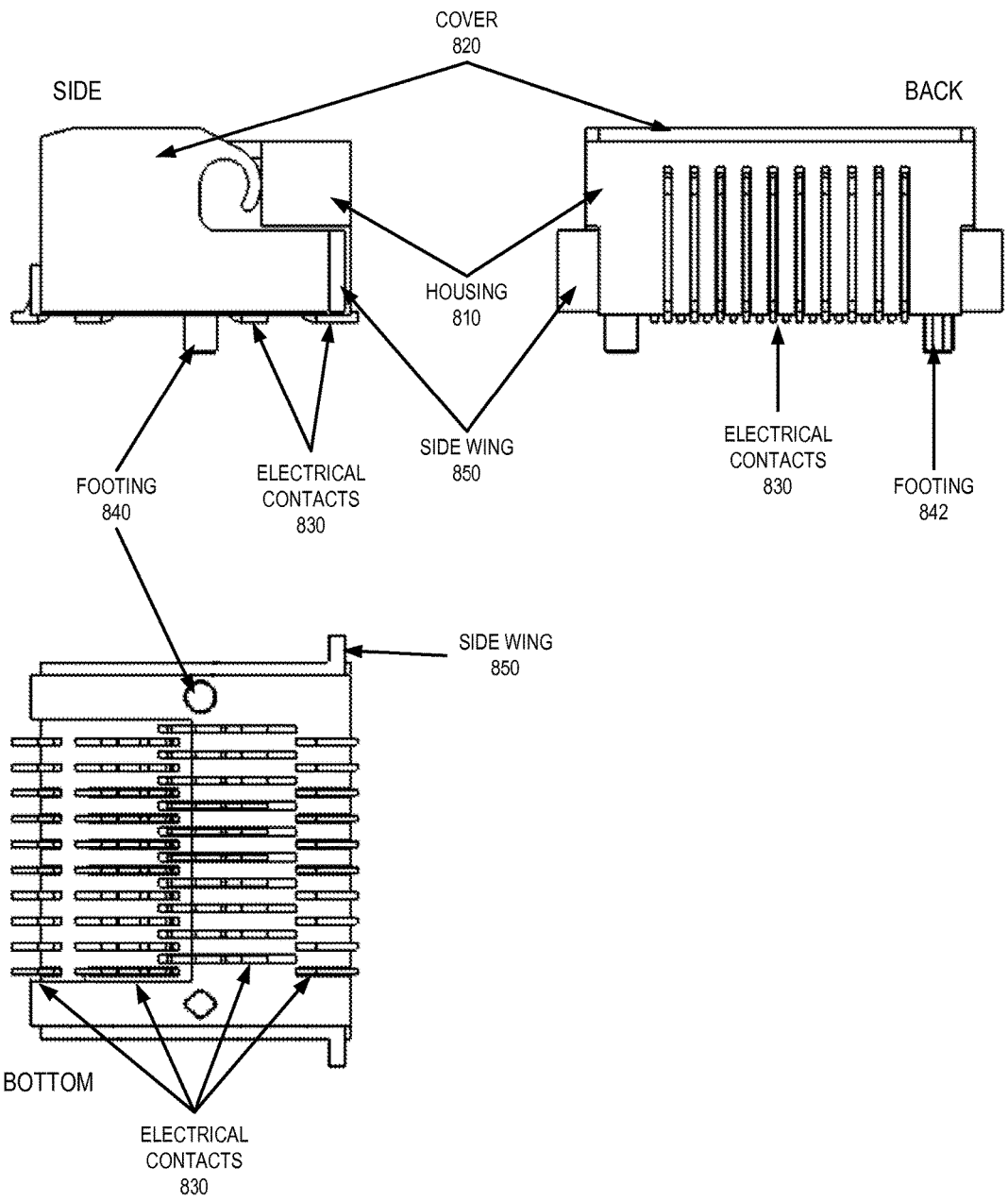
FIG. 8 is a block diagram of an embodiment of a connector including multiple rows of contacts, including a cover.

FIG. 8 is a block diagram of an embodiment of a connector including multiple rows of contacts, including a cover. The connector with cover is illustrated from the side, back, and bottom. Cover 820 is mounted over housing 810. Housing 810 represents a housing or connector in accordance with any embodiment described herein. Housing 810 can represents a connector that receives a pluggable device with additional rows of pads in accordance with any embodiment described herein.

Figure 9A:
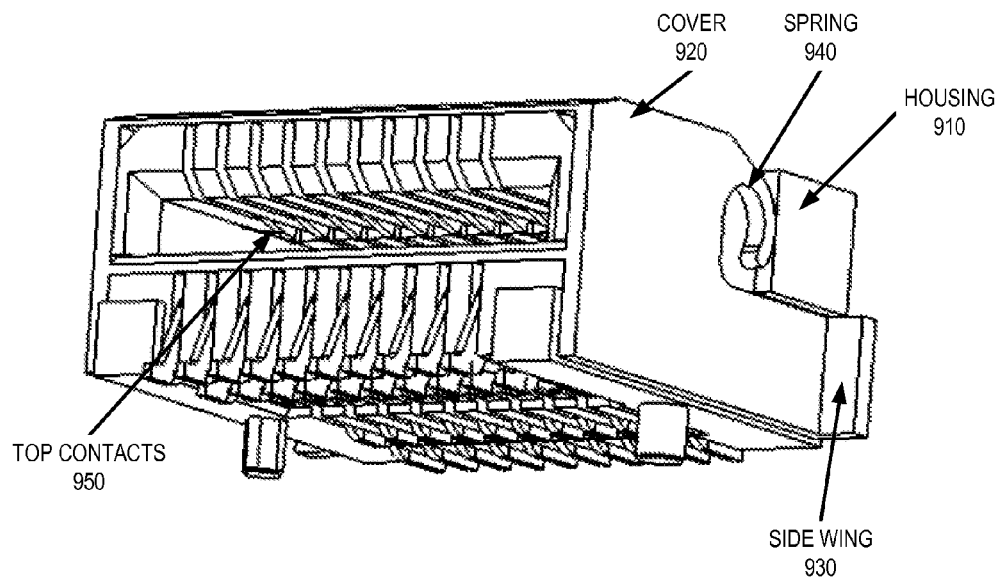
FIG. 9A is a block diagram of an embodiment of a perspective view of connector including multiple rows of contacts, including a cover.
Figure 9B:
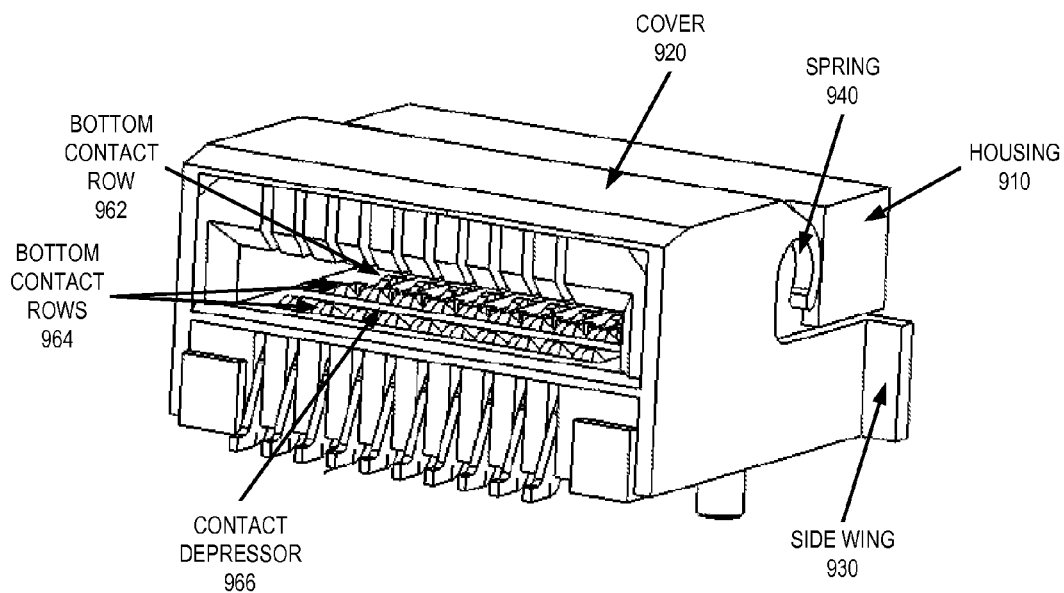
FIG. 9B is a block diagram of another embodiment of a perspective view of connector including multiple rows of contacts, including a cover.

In one embodiment, cover 820 includes a tongue portion (not specifically shown) that sits inside the mouth of connector housing 810 (see FIG. 9B). The tongue portion can selectively depress various electrical contacts 830 at the inside and/or front of connector housing 810 to prevent the electrical contacts from making contact with an inserted pluggable device. In one embodiment, cover 820 includes one or more side wings 850 that engage with legacy plug housing. The legacy plugs will push against side wing 850 (see FIG. 11A).

Connector housing 810 includes some sort of footing 840 to mount to a substrate or PCB on which the connector is disposed. It will be observed that typical footings such as footing 840 have a circular cross-section. In one embodiment, connector housing 810 includes footing 842 with a non-circular cross-section. More particularly, footing 842 has a different cross-sectional shape than footing 840 (e.g., both could have non-circular cross-sections). Different footing shapes allow easier orientation of the connector during manufacture. Footing 842 is illustrated as having a diamond shaped cross-section, but either or both of footing 842 and footing 840 could alternatively have a square, rectangular, triangular, oval, or other cross-sectional shape.

FIG. 9A is a block diagram of an embodiment of a perspective view of connector including multiple rows of contacts, including a cover. The connector includes cover 920 over housing 910. Side wing 930 is seen at the side of cover 920, near the back of connector housing 910 with respect to a direction of insertion of a pluggable device into connector housing 910. When engaged, side wing 930 pushes cover back into and against housing 910. Spring mechanism 940 pushes against a face or wall or housing 910 to provide a spring-back effect. Top contacts represent original or legacy contacts for a top surface of an inserted pluggable device.

FIG. 9B is a block diagram of another embodiment of a perspective view of connector including multiple rows of contacts, including a cover. Housing 910, over 920, side wing 930, and spring 940 are discussed with respect to FIG. 9A. From the perspective illustrated in FIG. 9B, bottom contact row 962 represents original or legacy contacts for a bottom surface of an inserted pluggable device. Bottom contact rows 964 illustrate two added rows of contacts. The added rows can both be for a non-subdivided single added row of pads (e.g., multiple contacts contact the same pad), a subdivided single row of added pads (e.g., some contacts could contact the same pad, while others contact only one subdivided pad), or for different rows of added pads (e.g., each added row of contacts corresponds to an added row of pads).

Contact depressor 966 illustrates a portion of the tongue of cover 920 that extends into housing 910. When side wing 930 is engaged, it pushes cover 920 toward housing 910, and causes depressor 966 to push into bottom row contacts 964 and depress the contacts. Thus, the contacts will be press down enough to not make contact with an inserted pluggable device. Consider as an example a legacy single-channel SFP optical transceiver and a new four-channel SFP optical transceiver. Engagement of a single-channel SFP optical transceiver into the illustrated connector could potentially scratch and/or short the bottom side of the optical transceiver PCB with added bottom row contacts 964. To avoid such scratching or shorting, the connector can include cover 920 (e.g., a movable plastic piece) with side wings 930 that engages with the single-channel SFP transceiver and drags the entire cover to push down bottom contacts 964. Thus, bottom contacts 964 will not touch the bottom side of the optical transceiver PCB. During disengagement of SFP transceiver, spring 940 provides a spring back effect, and moves cover 920 back to its nominal position. A four-channel optical transceiver can be made with a notch or space that will avoid engagement with side wings 930. In one embodiment, contact depressor 966 can first depress the contacts and then release the contacts during insertion of a four-channel transceiver (one with added pads on its PCB), and thus allow contacting between the added pads and added contacts, while also preventing scratching or shorting.

Figure 10A:
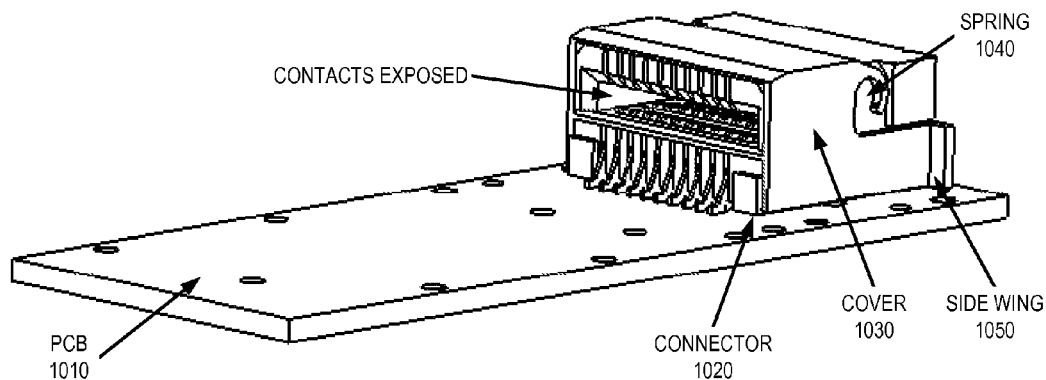
FIG. 10A is a block diagram of an embodiment of a perspective view of connector including multiple rows of contacts, including a cover where the contacts are exposed through the cover.
Figure 10B:
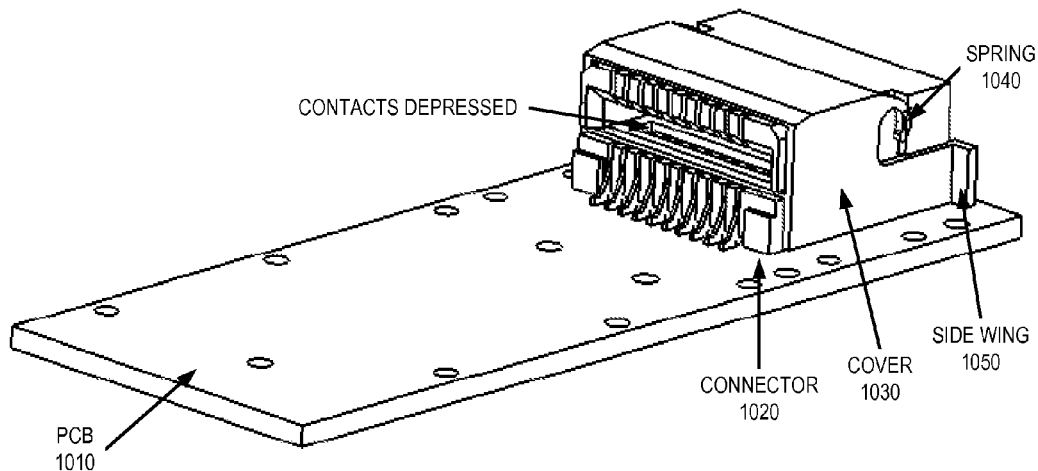
FIG. 10B is a block diagram of an embodiment of a perspective view of connector including multiple rows of contacts, including a cover where the contacts are depressed by the cover.

FIG. 10A is a block diagram of an embodiment of a perspective view of connector including multiple rows of contacts, including a cover where the contacts are exposed through the cover. Connector 1020 is disposed on PCB 1010, which is a substrate for the connector. Cover 1030 is over the connector housing, and includes side wings, similar to what is discussed above. In one embodiment, the housing is IR-reflowable, and cover 1030 is added after solder reflow. In one embodiment, cover 1030 is also IR-reflowable. Spring 1040 provides a spring back effect after engaged side wings 1050 are disengaged. When side wing 1050 is not engaged, the bottom row(s) of added contacts are exposed through cover 1030. When side wing 1050 is engaged, the bottom row(s) of added contacts are depressed, and covered up by cover 1030, as illustrated by FIG. 10B. It will be observed that spring 1040 is also engaged when side wing 1050 is engaged.

Figure 11A:
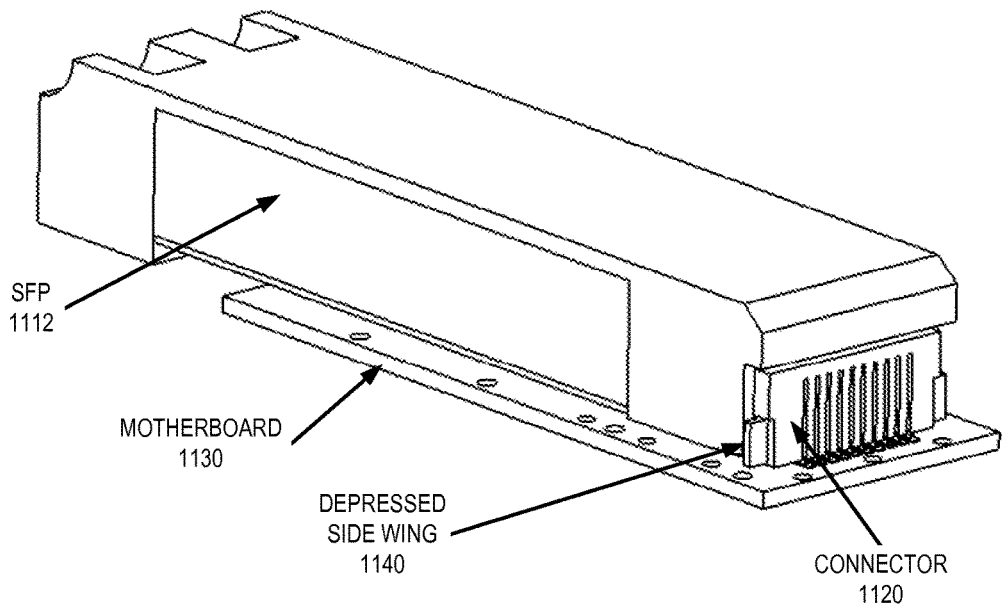
FIG. 11A is a block diagram of an embodiment of an SFP plug engaged with a connector, where the SFP plug engages with side wings of a cover over the connector.

FIG. 11A is a block diagram of an embodiment of an SFP plug engaged with a connector, where the SFP plug engages with side wings of a cover over the connector. SFP 1112 illustrates a legacy SFP transceiver, which has a housing that engages with, and depresses side wing 1140 of a cover over connector 1120. Connector 1120 is disposed on motherboard 1130, which represents a substrate to which connector 1120 and processor components (not shown) can be mounted. As discussed above, engaging or depressing side wing 1140 depresses added contacts (bottom row(s) and/or top row(s)) of contacts). It will be understood that in practice, SFP transceiver 1112 can also be made to latch onto connector 1120, which will hold the spring engaged until SFP transceiver 1112 is disengaged.

Figure 11B:
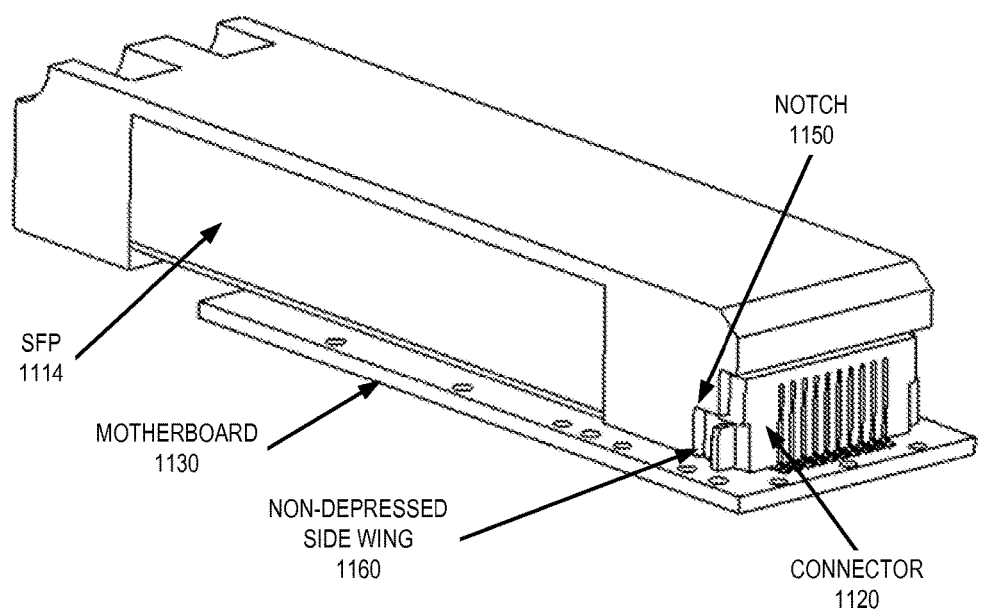
FIG. 11B is a block diagram of an embodiment of an SFP plug engaged with a connector, where the SFP plug does not engage with side wings of a cover over the connector.

FIG. 11B is a block diagram of an embodiment of an SFP plug engaged with a connector, where the SFP plug does not engage with side wings of a cover over the connector. SFP transceiver 1114 includes notch or cutout 1150, which prevents SFP transceiver 1114 from engaging with the side wing. Thus, connector 1120 is disposed on motherboard 1130 and includes a cover with non-depressed side wing 1160. SFP transceiver 1114 can latch onto connector 1120, but the spring will not be engaged, because the cover is not pushed back by the SFP housing.

Figure 12A:
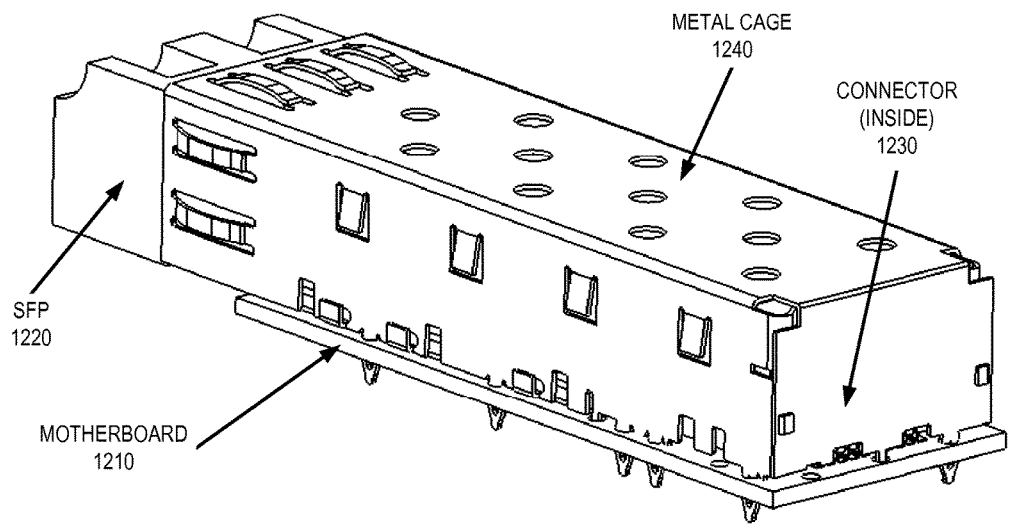
FIG. 12A is a block diagram of an embodiment of an SFP plug and connector housed in a metal cage.
Figure 12B:
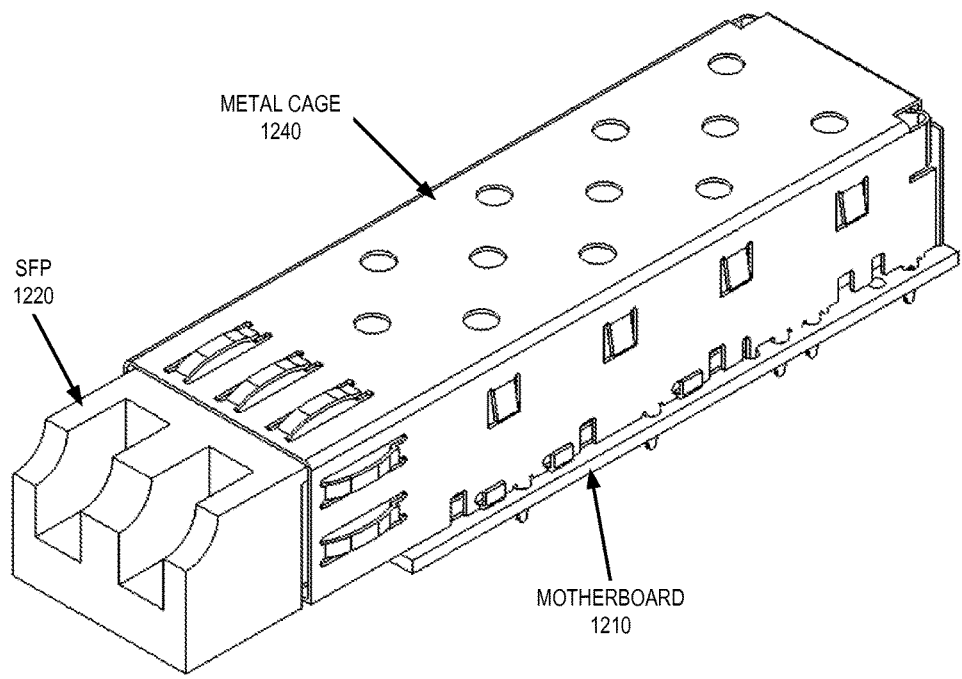
FIG. 12B is a block diagram of an embodiment of another perspective of the SFP plug and connector housed in a metal cage.

FIGS. 12A-12B illustrate block diagrams of an embodiment of an SFP plug and connector housed in a metal cage. Motherboard 1210 includes connector processing components. Connector 1230 is mounted to motherboard 1210, and is completely enclosed by metal cage 1240. SFP interface 1220 provides a lens for optical connection. Thus, in one embodiment, the mounted connector and transceiver can provide a peripheral port that allows an optical to electrical interface. Other types of connectors could alternatively be provided.

Figure 13:
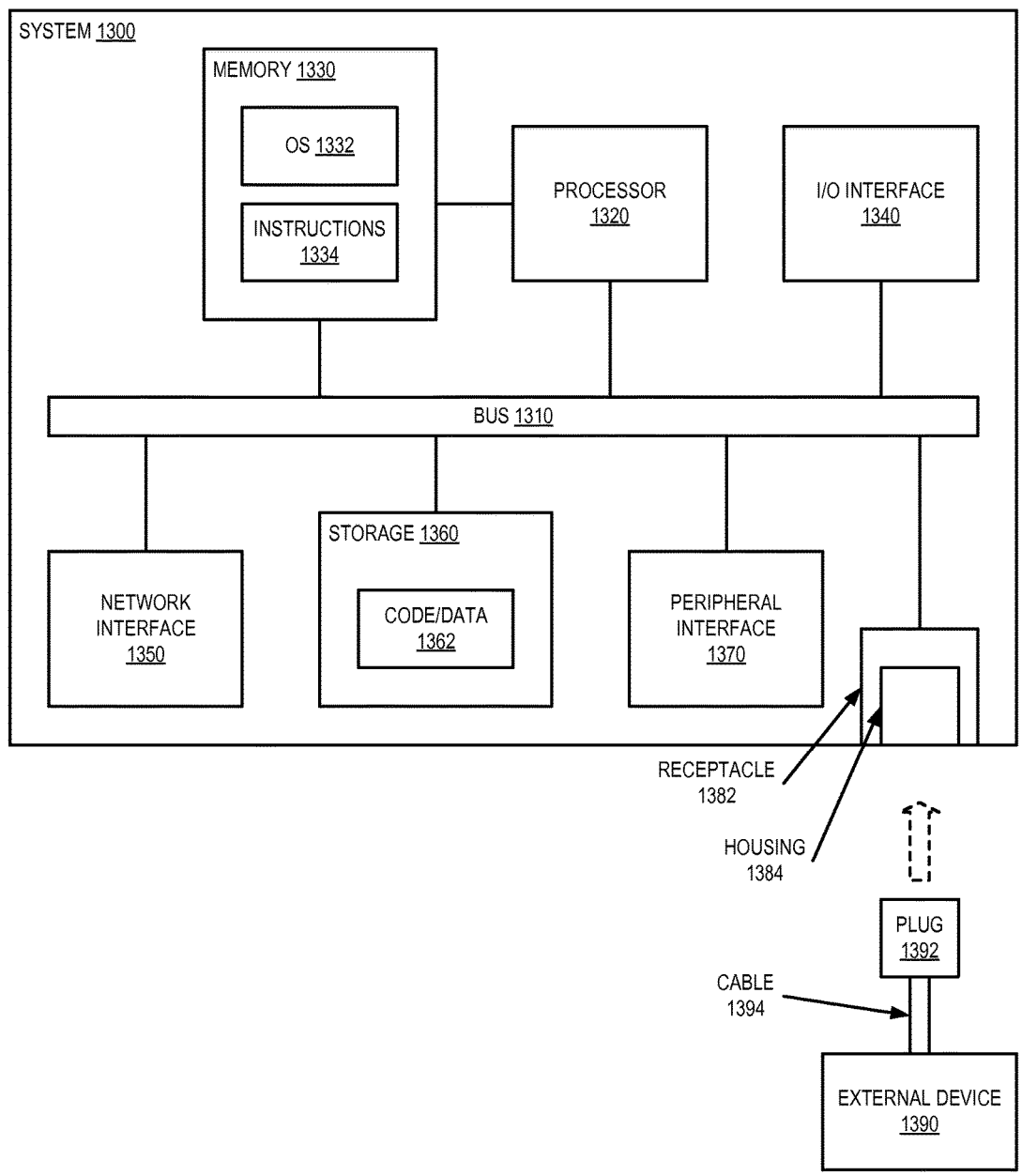
FIG. 13 is a block diagram of an embodiment of a computing system in which a connector system with multiple rows of pads and contacts can be used.

FIG. 13 is a block diagram of an embodiment of a computing system in which a connector system with multiple rows of pads and contacts can be used. System 1300 represents a computing device in accordance with any embodiment described herein, and can be a laptop computer, a desktop computer, a server, a switch, a gaming or entertainment control system, a scanner, copier, printer, or other electronic device. System 1300 includes processor 1320, which provides processing, operation management, and execution of instructions for system 1300. Processor 1320 can include any type of microprocessor, central processing unit (CPU), processing core, or other processing hardware to provide processing for system 1300. Processor 1320 controls the overall operation of system 1300, and can be include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 1330 represents the main memory of system 1300, and provides temporary storage for code to be executed by processor 1320, or data values to be used in executing a routine. Memory 1330 can include one or more memory devices such as read-only memory (ROM), flash memory, one or more varieties of random access memory (RAM), or other memory devices, or a combination of such devices. Memory 1330 stores and hosts, among other things, operating system (OS) 1332 to provide a software platform for execution of instructions in system 1300. Additionally, other instructions 1334 are stored and executed from memory 1330 to provide the logic and the processing of system 1300. OS 1332 and instructions 1334 are executed by processor 1320.

Processor 1320 and memory 1330 are coupled to bus/bus system 1310. Bus 1310 is an abstraction that represents any one or more separate physical buses, communication lines/interfaces, and/or point-to-point connections, connected by appropriate bridges, adapters, and/or controllers. Therefore, bus 1310 can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 1310 can also correspond to interfaces in network interface 1350.

System 1300 also includes one or more input/output (I/O) interface(s) 1340, network interface 1350, one or more internal mass storage device(s) 1360, and peripheral interface 1370 coupled to bus 1310. I/O interface 1340 can include one or more interface components through which a user interacts with system 1300 (e.g., video, audio, and/or alphanumeric interfacing). Network interface 1350 provides system 1300 the ability to communicate with remote devices (e.g., servers, other computing devices) over one or more networks. Network interface 1350 can include an Ethernet adapter, wireless interconnection components, USB (universal serial bus), or other wired or wireless standards-based or proprietary interfaces.

Storage 1360 can be or include any conventional medium for storing large amounts of data in a nonvolatile manner, such as one or more magnetic, solid state, or optical based disks, or a combination. Storage 1360 hold code or instructions and data 1362 in a persistent state (i.e., the value is retained despite interruption of power to system 1300). Storage 1360 can be generically considered to be a "memory," although memory 1330 is the executing or operating memory to provide instructions to processor 1320. Whereas storage 1360 is nonvolatile, memory 1330 can include volatile memory (i.e., the value or state of the data is indeterminate if power is interrupted to system 1300).

Peripheral interface 1370 can include any hardware interface not specifically mentioned above. Peripherals refer generally to devices that connect dependently to system 1300. A dependent connection is one where system 1300 provides the software and/or hardware platform on which operation executes, and with which a user interacts.

In one embodiment, system 1300 can include one or more receptacles 1382 with housing 1384 to receive plug 1392 or mate with plug 1392 to connect to external device 1390. Receptacle 1382 includes housing 1384, which provides the mechanical connection mechanisms. As used herein, mating one connector with another refers to providing a mechanical connection. The mating of one connector with another typically also provides a communication connection. Receptacle 1382 can connect directly to one or more buses of bus system 1310, or receptacle 1382 can be associated directly with one or more devices, such as network interface 1350, I/O interface 1340, storage 1360, peripheral interface 1370, or processor 1320.

Plug 1392 is a connector plug that allows external device 1390 (which can be any of the same types of devices discussed above) to interconnect with device 1300. Plug 1392 can be directly built into external device 1390 (with or without a cord or cable 1394), or can be interconnected to external device 1390 via a standalone cable 1394. In one embodiment, plug 1392 supports communication via an optical interface or both an optical interface and an electrical interface. The interconnection of receptacle 1382 to bus 1310 can similarly include an optical path or both an optical and electrical signal path. Receptacle 1382 can also include an optical communication connection that is converted to an electrical signal prior to being placed on bus 1310.

In one embodiment, the port formed by receptacle 1382 and housing 1384 and/or plug 1392 can be made with additional rows of pads and/or contacts, in accordance with any embodiment described herein. Thus, the connector subsystems can engage with connectors that provide greater bandwidth and speed. In one embodiment, a connector can include a cover that provides a mechanism to depress added contacts for backwards compatibility with legacy devices.

Figure 14:
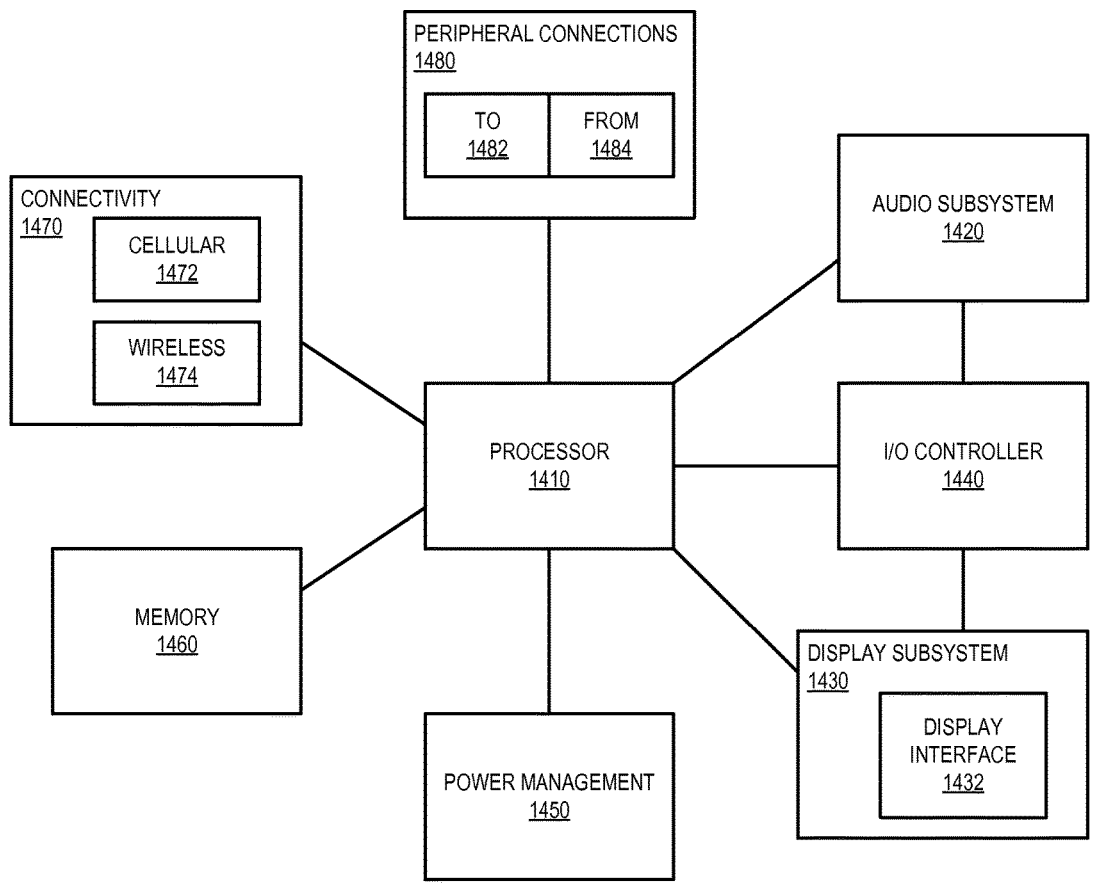
FIG. 14 is a block diagram of an embodiment of a mobile device in which a connector system with multiple rows of pads and contacts can be used.

FIG. 14 is a block diagram of an embodiment of a mobile device in which a connector system with multiple rows of pads and contacts can be used. Device 1400 represents a mobile computing device, such as a computing tablet, a mobile phone or smartphone, a wireless-enabled e-reader, or other mobile device. It will be understood that certain of the components are shown generally, and not all components of such a device are shown in device 1400.

Device 1400 includes processor 1410, which performs the primary processing operations of device 1400. Processor 1410 can include one or more physical devices, such as microprocessors, application processors, microcontrollers, programmable logic devices, or other processing means. In one embodiment, processor 1410 includes optical interface components in addition to a processor die. Thus, the processor die and photonic components are in the same package. Such a processor package can interface optically with an optical connector in accordance with any embodiment described herein.

The processing operations performed by processor 1410 include the execution of an operating platform or operating system on which applications and/or device functions are executed. The processing operations include operations related to I/O (input/output) with a human user or with other devices, operations related to power management, and/or operations related to connecting device 1400 to another device. The processing operations can also include operations related to audio I/O and/or display I/O.

In one embodiment, device 1400 includes audio subsystem 1420, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 1400, or connected to device 1400. In one embodiment, a user interacts with device 1400 by providing audio commands that are received and processed by processor 1410.

Display subsystem 1430 represents hardware (e.g., display devices) and software (e.g., drivers) components that provide a visual and/or tactile display for a user to interact with the computing device. Display subsystem 1430 includes display interface 1432, which includes the particular screen or hardware device used to provide a display to a user. In one embodiment, display interface 1432 includes logic separate from processor 1410 to perform at least some processing related to the display. In one embodiment, display subsystem 1430 includes a touchscreen device that provides both output and input to a user.

I/O controller 1440 represents hardware devices and software components related to interaction with a user. I/O controller 1440 can operate to manage hardware that is part of audio subsystem 1420 and/or display subsystem 1430. Additionally, I/O controller 1440 illustrates a connection point for additional devices that connect to device 1400 through which a user might interact with the system. For example, devices that can be attached to device 1400 might include microphone devices, speaker or stereo systems, video systems or other display device, keyboard or keypad devices, or other I/O devices for use with specific applications such as card readers or other devices.

As mentioned above, I/O controller 1440 can interact with audio subsystem 1420 and/or display subsystem 1430. For example, input through a microphone or other audio device can provide input or commands for one or more applications or functions of device 1400. Additionally, audio output can be provided instead of or in addition to display output. In another example, if display subsystem includes a touchscreen, the display device also acts as an input device, which can be at least partially managed by I/O controller 1440. There can also be additional buttons or switches on device 1400 to provide I/O functions managed by I/O controller 1440.

In one embodiment, I/O controller 1440 manages devices such as accelerometers, cameras, light sensors or other environmental sensors, gyroscopes, global positioning system (GPS), or other hardware that can be included in device 1400. The input can be part of direct user interaction, as well as providing environmental input to the system to influence its operations (such as filtering for noise, adjusting displays for brightness detection, applying a flash for a camera, or other features).

In one embodiment, device 800 includes power management 850 that manages battery power usage, charging of the battery, and features related to power saving operation. Memory subsystem 860 includes memory device(s) for storing information in device 800. Memory 860 can include nonvolatile (state does not change if power to the memory device is interrupted) and/or volatile (state is indeterminate if power to the memory device is interrupted) memory devices. Memory 860 can store application data, user data, music, photos, documents, or other data, as well as system data (whether long-term or temporary) related to the execution of the applications and functions of system 800.

Connectivity 1470 includes hardware devices (e.g., wireless and/or wired connectors and communication hardware) and software components (e.g., drivers, protocol stacks) to enable device 1400 to communicate with external devices. The device could be separate devices, such as other computing devices, wireless access points or base stations, as well as peripherals such as headsets, printers, or other devices.

Connectivity 1470 can include multiple different types of connectivity. To generalize, device 1400 is illustrated with cellular connectivity 1472 and wireless connectivity 1474. Cellular connectivity 1472 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 1474 refers to wireless connectivity that is not cellular, and can include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 1480 include hardware interfaces and connectors, as well as software components (e.g., drivers, protocol stacks) to make peripheral connections. It will be understood that device 1400 could both be a peripheral device ("to" 1482) to other computing devices, as well as have peripheral devices ("from" 1484) connected to it. Device 1400 commonly has a "docking" connector to connect to other computing devices for purposes such as managing (e.g., downloading and/or uploading, changing, synchronizing) content on device 1400. Additionally, a docking connector can allow device 1400 to connect to certain peripherals that allow device 1400 to control content output, for example, to audiovisual or other systems.

In addition to a proprietary docking connector or other proprietary connection hardware, device 1400 can make peripheral connections 1480 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

In one embodiment, any peripheral connection 1480 and/or a connectivity connection 1470 can be performed with a connector subsystem having additional rows of pads and/or contacts, in accordance with any embodiment described herein. Thus, the connector subsystems can engage with connectors that provide greater bandwidth and speed. In one embodiment, a connector can include a cover that provides a mechanism to depress added contacts for backwards compatibility with legacy devices. In one embodiment, any of the interconnections or I/O can be performed optically, and interconnected with SFP connectors in accordance with the additional contacts and/or pads in accordance with any embodiment described herein.

Figure 15:
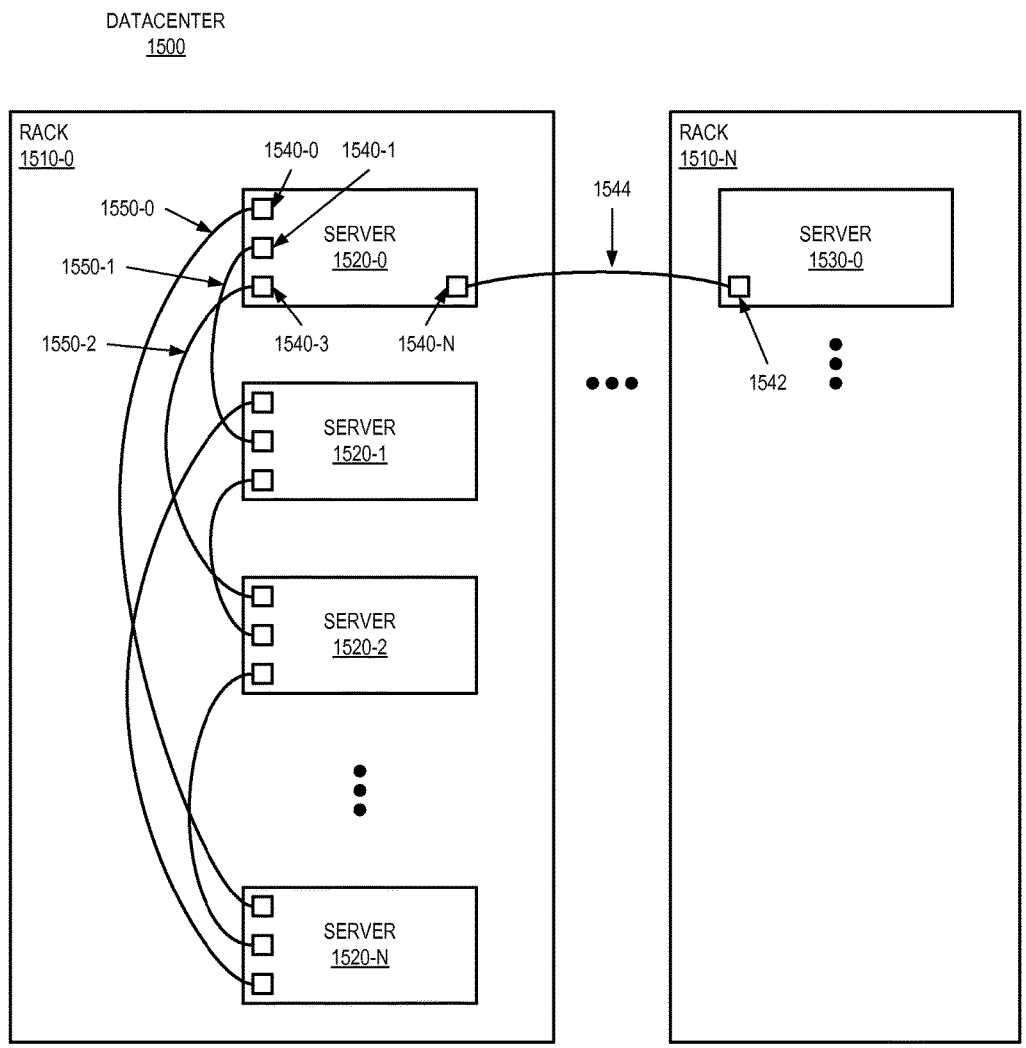
FIG. 15 is a block diagram of an embodiment of a data center in which a connector system with multiple rows of pads and contacts can be used.

FIG. 15 is a block diagram of an embodiment of a data center in which a connector system with multiple rows of pads and contacts can be used. Datacenter 1500 includes a plurality of server racks 1510-0 through 1510-N. Each server rack includes a plurality of server machines, such as 1520-0 through 1520-N of server rack 1510-0. A server machine is a physical computer (a computer hardware system) including at least one logic processor, which can include single and/or multicore processor devices, graphics processors, and/or other processing unit. Each server machine includes at least one connector with multiple rows of contacts to be used with pluggable devices having multiple rows of pads, and can include a plurality of connector systems (e.g., 1540-0, 1540-1, 1540-2). In one embodiment, each connector provides a physical port to which a plug cable assembly (e.g., 1550-0, 1550-1, 1550-2) is mated. In one embodiment, the plug cable assemblies are optical plug cable assemblies, and each connector provides a high-speed, high-bandwidth electrical port to which the optical cable is connected. The plug cable assemblies form a physical link between connectors in separate machines (e.g., intra-rack connections between server machines 1520-0 through 1520-N, or between a server machine and a TOR switch, inter-rack connections between server machines 1520-0 and 1530-0 (with ports 1540-N and 1542 via cable 1544, or other connections).

In one aspect, a connector device includes a first row of electrical contacts to connect to a corresponding first row of pads on a surface of a pluggable device, the first row substantially perpendicular to a direction of insertion of the pluggable device; and a second row of electrical contacts substantially parallel to the first row to connect to a corresponding second row of pads on the surface of the pluggable device, the second row substantially perpendicular to the direction of insertion of the pluggable device.

In one embodiment, the surface of the pluggable device comprises a top surface facing away from a substrate on which the connector device is mounted. In one embodiment, the surface of the pluggable device comprises a bottom surface facing toward a substrate on which the connector device is mounted. In one embodiment, the connector further includes a third row of electrical contacts substantially parallel to the second row to connect to a corresponding third row of pads on the surface of the pluggable device. In one embodiment, the connector device comprises a connector for a small form factor pluggable (SFP) device. In one embodiment, the first and second rows of contacts are disposed in a housing, and further comprising a cover over the housing, including side wings to engage with a legacy pluggable device that does not include a second row of pads, and depress the second row of contacts to avoid contact between the second row of contacts and the surface of the pluggable device. In one embodiment, the connector further includes a spring mechanism in the cover to release depressing the second row of contacts when the legacy pluggable device does not engage with the side wings.

In one aspect, a small form factor pluggable (SFP) transceiver includes a first row of pads on a first surface to connect to a corresponding first row of electrical contacts of a mating connector, the first row substantially perpendicular to a direction of insertion of the SPF transceiver; and a second row of pads on the first surface substantially parallel to the first row to connect to a corresponding second row of electrical contacts, the second row substantially perpendicular to the direction of insertion of the SFP transceiver.

In one embodiment, the first surface comprises a top surface facing away from a substrate on which the connector device is mounted. In one embodiment, the first surface comprises a bottom surface facing toward a substrate on which the connector device is mounted. In one embodiment, the SFP transceiver further includes a first row of pads on a second surface to connect to a corresponding first row of electrical contacts of the mating connector, the first row substantially perpendicular to the direction of insertion of the SPF transceiver; and a second row of pads on the second surface substantially parallel to the first row to connect to a corresponding second row of electrical contacts, the second row substantially perpendicular to the direction of insertion of the SFP transceiver. In one embodiment, the second row of pads is subdivided, where at least one column of pads includes three rows of pads, and at least one column of pads includes two rows of pads. In one embodiment, the second row of pads includes at least one pad that is disposed at an angle less than 90 degrees offset from the direction of insertion. In one embodiment, the SFP transceiver further includes a third row of pads on the first surface substantially parallel to the second row to connect to a corresponding third row of electrical contacts. In one embodiment, the SFP includes a housing, and further comprising a cutout in the housing to avoid engaging with side wings of a cover over the mating connector to avoid depressing the second row of contacts to allow contact between the second row of contacts and the second row of pads.

In one aspect, a system includes a printed circuit board (PCB); a connector housing to dispose a connector onto the PCB, the housing including a first row of electrical contacts to connect to a corresponding first row of an array of pads on a surface of a small form factor pluggable (SFP) transceiver; and a second row of electrical contacts substantially parallel to the first row to connect to a corresponding second row of the array of pads on the surface of the SFP transceiver; and at least one footing on the connector housing having a non-circular cross section.

In one embodiment, the connector housing includes a row of contacts to connect to a second surface of the SFP transceiver, wherein the first and second surfaces of the SFP transceiver include different numbers of rows of pads. In one embodiment, the connector housing further comprises a third row of electrical contacts substantially parallel to the second row to connect to a corresponding third row of pads on the surface of the SFP transceiver. In one embodiment, the system further includes a cover over the housing, including side wings to engage with a legacy SFP transceiver that does not include a second row of pads, wherein the housing includes a contact depressor to depress the second row of contacts when the side wings are engaged to avoid contact between the second row of contacts and the surface of the SFP transceiver. In one embodiment, the system further includes a spring mechanism in the cover to release depressing the second row of contacts when the legacy SFP transceiver does not engage with the side wings.

Flow diagrams as illustrated herein provide examples of sequences of various process actions. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A connector device comprising:
    a housing comprising a first surface and a second surface;
    a first set of rows of electrical contacts on the first surface to connect to corresponding pads of a pluggable device, the first set of rows of the electrical contacts substantially perpendicular to a direction of insertion of the pluggable device;
    a second set of rows of electrical contacts on the second surface substantially parallel to the first set of rows to connect to corresponding pads of the pluggable device, the second set of rows substantially perpendicular to the direction of insertion of the pluggable device; and
    a cover over the housing, the cover including a side wing to engage with a legacy pluggable device, wherein at least one row of the first set of rows or the second set of rows is depressed using the side wing when the legacy pluggable device is engaged.

2. The connector device of claim 1, wherein the first surface is a top surface facing away from a substrate on which the connector device is mounted.

3. The connector device of claim 1, wherein the second surface is a bottom surface facing toward a substrate on which the connector device is mounted.

4. The connector device of claim 1, wherein the second set of rows comprises at least three rows of electrical contacts.

5. The connector device of claim 1, wherein the connector device comprises a connector for a small form factor pluggable (SFP) device.

6. The connector device of claim 1, further comprising:
a spring mechanism in the cover to release depressing of the at least one row of the first set of rows or the second set of rows when the legacy pluggable device does not engage with the side wing.

\* \* \* \* \*